(12) United States Patent
Hulshof (10) Patent No.: US 6,761,082 B2
(45) Date of Patent: Jul. 13, 2004

(54) GEAR DRIVE APPARATUS WITH POWER BRANCHING FOR CONVERTING A ROTATIONAL INPUT INTO A PREDETERMINED ROTATIONAL OUTPUT

(75) Inventor: Frans Hulshof, Winterswijk (NL)

(73) Assignee: Winergy AG (DE)

( * ) Notice: Subject to any disclaimer, the term of this patent is extended or adjusted under 35 U.S.C. 154(b) by 14 days.

(21) Appl. No.: 10/193,471

(22) Filed: Jul. 10, 2002

(65) Prior Publication Data

US 2003/0015052 A1 Jan. 23, 2003

(30) Foreign Application Priority Data

Jul. 18, 2001 (DE) .......................................... 101 34 245

(51) Int. Cl.[7] ................................................. F16H 1/28
(52) U.S. Cl. ...................................... 74/410; 74/665 G
(58) Field of Search .............................. 74/410, 665 F, 74/665 G, 665 GA, 665 GD; 310/83; 290/44, 55

(56) References Cited

U.S. PATENT DOCUMENTS

| | | | | |
|---|---|---|---|---|
| 1,351,318 | A | * | 8/1920 | Alquist .......................... 74/410 |
| 2,823,558 | A | * | 2/1958 | Semar et al. .............. 74/665 B |
| 4,903,546 | A | | 2/1990 | Quintille |
| 6,364,611 | B1 | * | 4/2002 | Matsuda et al. ........ 416/170 R |
| 6,420,808 | B1 | | 7/2002 | Hüsle |

FOREIGN PATENT DOCUMENTS

| | | |
|---|---|---|
| DE | 762 696 | 6/1953 |
| DE | 43 43 484 | 6/1995 |
| DE | 199 17 605 | 7/2002 |
| GB | 1558149 | 12/1979 |

OTHER PUBLICATIONS

JP 090045558, Patent Abstract of Japan.

* cited by examiner

Primary Examiner—William C. Joyce
(74) Attorney, Agent, or Firm—R W Becker & Associates; R W Becker (57) ABSTRACT

A gear drive apparatus for converting a rotational input provided by a drive device, such as a wind power generator rotor, into a predetermined rotational output for driving rotation of a driven device, such as a generator, includes a large gear coupled to the drive device and a pair of output pinion shafts coupled to the driven device. A first gear level includes eight primary level pinion shafts each having gear teeth meshingly engaged with the outer circumferential gear teeth of the first large gear. The eight primary level gear or pinions are coaxially secured to the eight primary level pinion shafts for driving rotation thereof. Four secondary level gears and four secondary level pinion shafts form a secondary gear level which rotates the pair of output pinion shafts.

10 Claims, 9 Drawing Sheets

GEAR DRIVE APPARATUS WITH POWER BRANCHING FOR CONVERTING A ROTATIONAL INPUT INTO A PREDETERMINED ROTATIONAL OUTPUT

BACKGROUND OF THE INVENTION

The present invention relates to a gear drive apparatus with power branching for converting a rotational input into a predetermined rotational output.

Appended or add-on gear units having internal power branching in the form of a planetary arrangement or an axially freely adjustable gear with a herringbone tooth arrangement are known, whereby the gear unit typically includes an input shaft and an output shaft. Such add-on gear units, which are used, among other purposes, for driving generators in response to rotational inputs by rotors of wind power arrangements, are most often connected via a press fit coupling with the shaft of the rotor. In this conventional configuration, the hub of the press fit couplings is, most typically, a component of a planetary gear support and located inside the gear housing. The planetary gears of the encircling planetary gear carrier mesh with the inner gear teeth of a gear which is fixedly secured to the gear housing and these planetary gears mesh with, at the same time, a sun gear through which the power is combinatorily integrated. The levels of such planetary gear units can comprise three, four, five, or even, six, planetary gears. The power from the shaft of the sun gear in the primary level of such arrangements is converted either by an additional planetary gear level with a spur gear level which is driven by the output of this primary gear level or by two serially arranged spur gear levels, each of which is configured with a simple helical gear arrangement, and the power is then transferred to a generator.

The known gear drive arrangements are too complex for the higher level power output classes, as well as being too heavy and are subject, due to the high torque or torsional moments in combination with the relatively large dimensions of the arrangements, to large deformations and the non-uniform load distributions which result from such deformations. Such known gear drive arrangements include large assembly dimensions. Moreover, in the event of a repair of such a gear drive arrangement on the tower of a wind power arrangement, typically, no toothed components or bearings of the planetary gear arrangement can be exchanged. A disassembly of the complete gear drive arrangement or larger sub-assemblies of such a gear drive arrangement requires—in particular, in connection with off-shore arrangements—relatively expensive crane capacities. A further disadvantage is that, with increasingly larger gear drive arrangements and 4 pole generators in the 60 hertz level, such gear drive arrangements are increasingly heavier and it is difficult with conventionally available shaft bearings to realize a sufficiently long bearing operational life for the high rates of rotation without exceeding the maximally allowable revolutions per minute stipulated by the bearing manufacturers.

SUMMARY OF THE INVENTION

The present invention provides a solution to the challenge of providing a gear drive apparatus which is characterized as a relatively compact and non-heavy assembly which is, moreover, simple to mount and assemble as well as to disassemble.

The gear drive apparatus of the present invention can be deployed as a gear or speed step-up drive as well as a gear or speed reduction drive. The gear drive apparatus has, for a speed step-up arrangement at a rapid speed, an input shaft and two output shafts. In connection with a configuration of the gear drive apparatus as a speed reduction arrangement to reduce the output rotational speed to a relatively slower speed, two motors drive a single rotational output shaft via two input shafts. The gear drive arrangement, which is preferably configured as an add-on arrangement, is advantageously deployed as a speed step-up arrangement in connection with the drive of wind power generators. In connection with a deployment of this type, the gear drive apparatus of the present invention provides the most significant advantages. In connection with a speed reduction arrangement, the gear drive apparatus of the present invention can be deployed, for example, to drive the operation of rod mills or cutting heads of excavators or shovels.

Due to the particular bearing support and location of the individual shafts to one another, the gear drive apparatus of the present invention provides a symmetrical drive arrangement with a center of mass located in the principal axis. Up to two pinion shafts having gears can be deployed for meshing engagement with the large gear and all of the gears and bearings of such an arrangement can be disposed in a gear housing with three parting lines. In connection with the use of the gear drive apparatus of the present invention in a wind power arrangement, a virtually complete disassembly or a virtually complete exchange of parts on the tower of the wind power arrangement is possible with the use of only limited crane capacity.

Due to the power distribution and gear arrangements of the gear drive apparatus of the present invention, the power transmission capabilities of the teeth of the large gear are optimally used or exploited and, thus, the torque conversion is optimally exploited.

Via the arrangement of the anti-friction bearings of the eight pinion shafts operably connected with the large gear in two parallel and torsionally mutually stiffened gear housing walls, which are, at the same time, configured as torque or torsional moment fulcrums, there is provided a very torsionally stiff gear drive apparatus, whereby the disadvantageous deformations of a planetary gear drive apparatus are not present.

The present invention provides an optimal access to all of the bearing locations and the gear teeth meshing locations for the purpose of providing lubrication thereto and for conducting a temperature monitoring of the bearing locations.

Due to the reproducibility of many of the internal components of the gear drive apparatus of the present invention, a cost favorable production of the gear drive apparatus of the present invention is possible with proportionally reduced rigging costs and a cost favorable replacement part outlook.

The position of the rapidly rotating output shaft is selected such that the two generators of the wind power arrangement can be optimally located relative to one another. The distance between the generators provides sufficient access.

The gear drive apparatus of the present invention makes possible, in contrast to a conventional planetary gear drive apparatus, the disposition of a press fit disc or cinch collar for transferring the torque of the rotor shaft in the hollow access or shaft of the gear drive apparatus at both the output side and the input side of the gear drive apparatus. With the gear drive arrangement of the press fit disc or cinch collar on the rotational output side—which is not possible in connection with a planetary gear drive apparatus—it is possible to achieve the smallest possible total assembled length.

In connection with the operation of the gear drive apparatus of the present invention, it is possible to deploy the gear drive apparatus as an add-on gear drive apparatus for a rotor shaft separately supported at two locations or, at the same time, as the second bearing support of a rotor shaft as has often typically been configured. The gear drive apparatus of the present invention can also be configured as an add-on gear drive apparatus without a bearing support function between the bearing supports of the rotor. This has the advantage that a large distance between the bearing supports of the rotor shaft can be achieved.

A bore for the passage therethrough of a control conduit to control a change of pitch of the rotor of the wind power arrangement can be directly configured in the rotor shaft so that the need to provide a special purpose conduit, as has heretofore been required, for achieving a change of pitch of the adjustable pitch rotor, can be dispensed with.

In the event of a fall out or stoppage of a generator, the gear drive apparatus of the present invention is still fully capable of functioning because the power integrations of the individual gear lines occur independently of one another.

Due to the power branching and/or the power integration by means of two axially freely supported high speed output shafts having herringbone gear teeth, the shaft dimensions are smaller than those of a mono-generator drive. Due to the absence of axial bearing supports for the shafts, it is also possible, in connection with very high excess or overspeed revolutions per minute of these shafts, to deploy conventionally available shaft bearing supports which bring with them sufficient bearing operational life.

BRIEF DESCRIPTION OF THE DRAWINGS

Several embodiments of the gear drive apparatus of the present invention are described in the hereinafter following description in connection with the figures of the drawings, in which.

DETAILED DESCRIPTION OF THE PREFERRED EMBODIMENT

The one embodiment of the gear drive apparatus shown in FIGS. 1–6 is configured as an add-on gear drive apparatus which operates to step up or increase the rotational output of a wind power arrangement by, for example, rotationally driving two generators which are powered by a rotor of the wind power arrangement, and the gear drive apparatus shown FIGS. 1–6 is disposed on the tower of the wind power apparatus between the rotor thereof and the generators thereof. The gear drive apparatus comprises a large gear 1 having gear teeth along its outer circumference. The large gear 1 is fixedly secured to a hollow shaft, which is supported on bearings at two locations within a gear housing which encloses the gear drive apparatus, and the large gear 1 is coupled to a rotational input shaft—namely, the shaft of the rotor of the wind power apparatus.

Eight pinion shafts 2 are symmetrically arranged around the large gear 1, the pinions of the pinion shafts 2 being in meshing engagement with the large gear 1. The bearings of the pinion shafts 2 are disposed in two oppositely disposed gear housing walls of the gear housing. Due to the symmetrical arrangement of the pinion shafts 2, the bearing support of the hollow shaft, which supports the large gear 1—as viewed from the perspective of the weight of the large gear 1 and the hollow shaft—are free of radial forces in connection with a uniform loading of the generators.

A primary level gear or pinion 3a or 3b is connected to each respective pinion shaft 2. Each pinion 3a is associated with a respective one of the pinions 3b in that they together form a gear pair arranged in alternating manner such that one of the gears of the gear pair is on one axial side of the large gear 1 and the other gear of the gear pair is on the opposite axial side of the large gear 1. The gears 3a, 3b are configured with helical teeth gearing, which, in correspondence with the respective arrangement of the gear on the one axial side of the large gear 1 or the opposite axial side of the large gear, increases in a respective left or right direction.

Each respective gear pair comprised of one of the pinions 3a and its associated pinions 3b of the pinion shafts 2 meshingly engages a respective common single pinion shaft 4 which is provided with a herringbone gear tooth arrangement and is axially freely supported. The axial freedom of movement of the pinion shafts 4 provides force compensation of the gear meshing forces of the helical gear teeth of the gear pairs such that these gear meshing forces are of the same magnitude, whereby the torque or torsional moments on the pinion shafts 2 are of the same magnitude. The four pinion shafts 4 together with the eight pinion shafts 2 arranged around the large gear 1 comprise a primary gear level or stage in which a first power combination or integration occurs. In this first power integration, the power output of the eight pinion shafts 2 is uniformly converted by the four common pinion shafts 4.

The four common pinion shafts 4 each are connected to a respective gear 5 which itself meshingly engages a further pinion shaft 6 to drivingly rotate the further pinion shaft 6 in order to produce a further increase in the rate of rotation. The four pinion shafts 6 each support a respective gear 7 which is fixedly secured to the respective pinion shaft 6 and is provided with helical gearing teeth. The helical gearing teeth of the gears 7 exhibit differing pitches which are configured in accordance with the arrangement of the gear 7 in a respective increasing left or right direction. Each respective pair of the gears 7 having respectively different left or right increasing directions of their helical gear teeth form a gear pair each of which is associated with a common pinion shaft 8. The two pinion shafts 8 are, in the one embodiment of the gear drive apparatus shown in FIG. 1, each operably coupled to a respective one of the two generators of the wind power apparatus. The pinion shafts 8 are, in like manner to the pinion shafts 4, configured with herringbone gear teeth configurations and are axially freely supported. The four pinion shafts 6 together with the two pinion shafts 8 comprise a secondary gear level or stage in which a further combination and conversion of the power occurs. The total power supplied to the large gear 1 from the rotor of the wind power apparatus is thus concentrated into two shafts—the pinion shafts 8—and can, thus, be further transferred to the two generators of the wind power apparatus.

The gears and shafts of the afore-described gear drive apparatus are housed in a gear housing which is preferably partitioned by two parallel parting lines 11 and a diagonally extending parting line 12 into four gear housing components. The parting lines are shown by straight lines in FIGS. 5 and 6. In the gear housing, on both sides of the vertical parting lines 11, four of the eight pinion shafts 2 of the primary gear level, the four common pinion shafts 4 of the primary gear level, the four pinion shafts 6 of the secondary gear level, and the two pinion shafts 8 are arranged. The large gear 1 and, additionally, two of the eight pinion shafts 2 of the primary gear level, are disposed on both sides of the diagonally extending parting line 12. All of these shafts and gears can be radially outwardly removed after opening of the gear housing along the parting lines 11, 12. This can be accomplished on the tower of the wind power apparatus without the need for a large crane capacity. Solely two of the eight pinion shafts 2, which are arranged on the side of the large gear 1 facing toward the generators, are not on one of the parting lines 11, 12. These two outlying pinion shafts 2 cannot, thus, be radially removed and must, instead, be removed in an axial direction.

Figure 1:
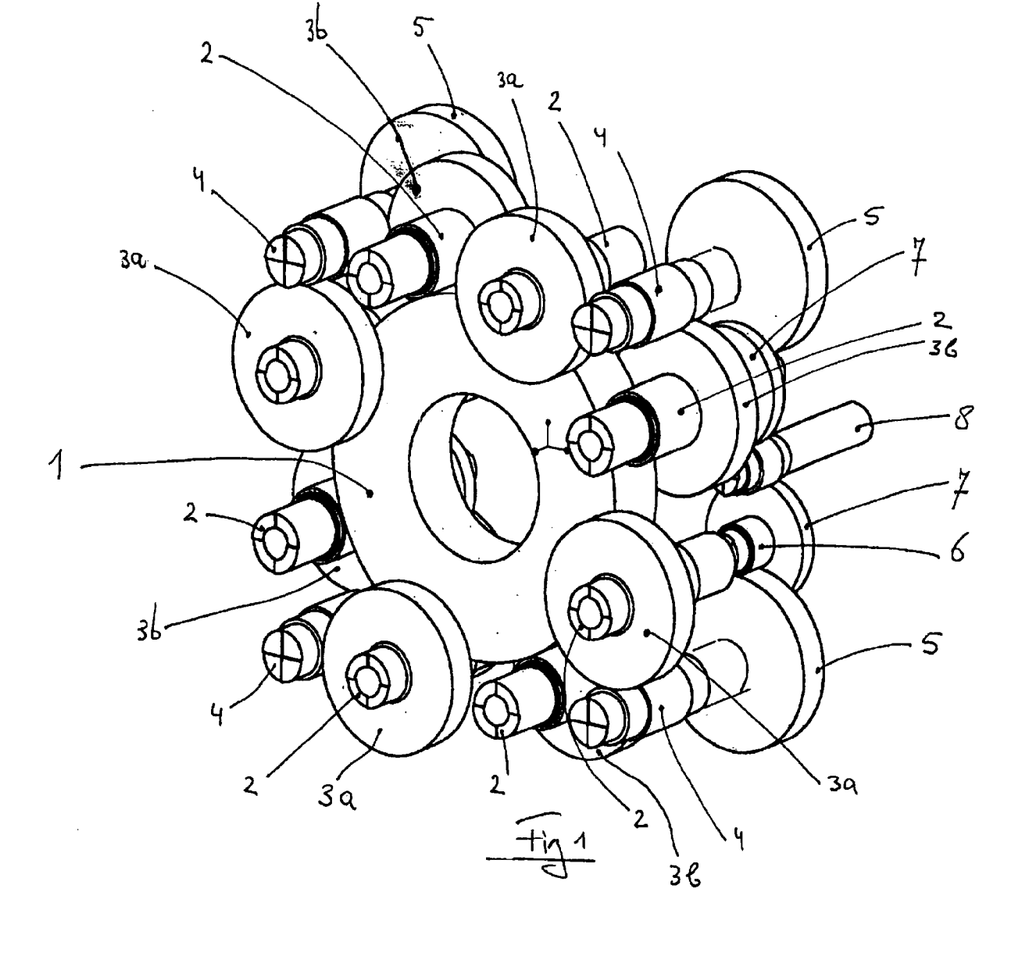
FIG. 1 is a perspective view of one embodiment of the gear drive apparatus of the present invention shown in an application in connection with a wind power arrangement as seen from the perspective of the rotor side of the gear drive apparatus.
Figure 2:
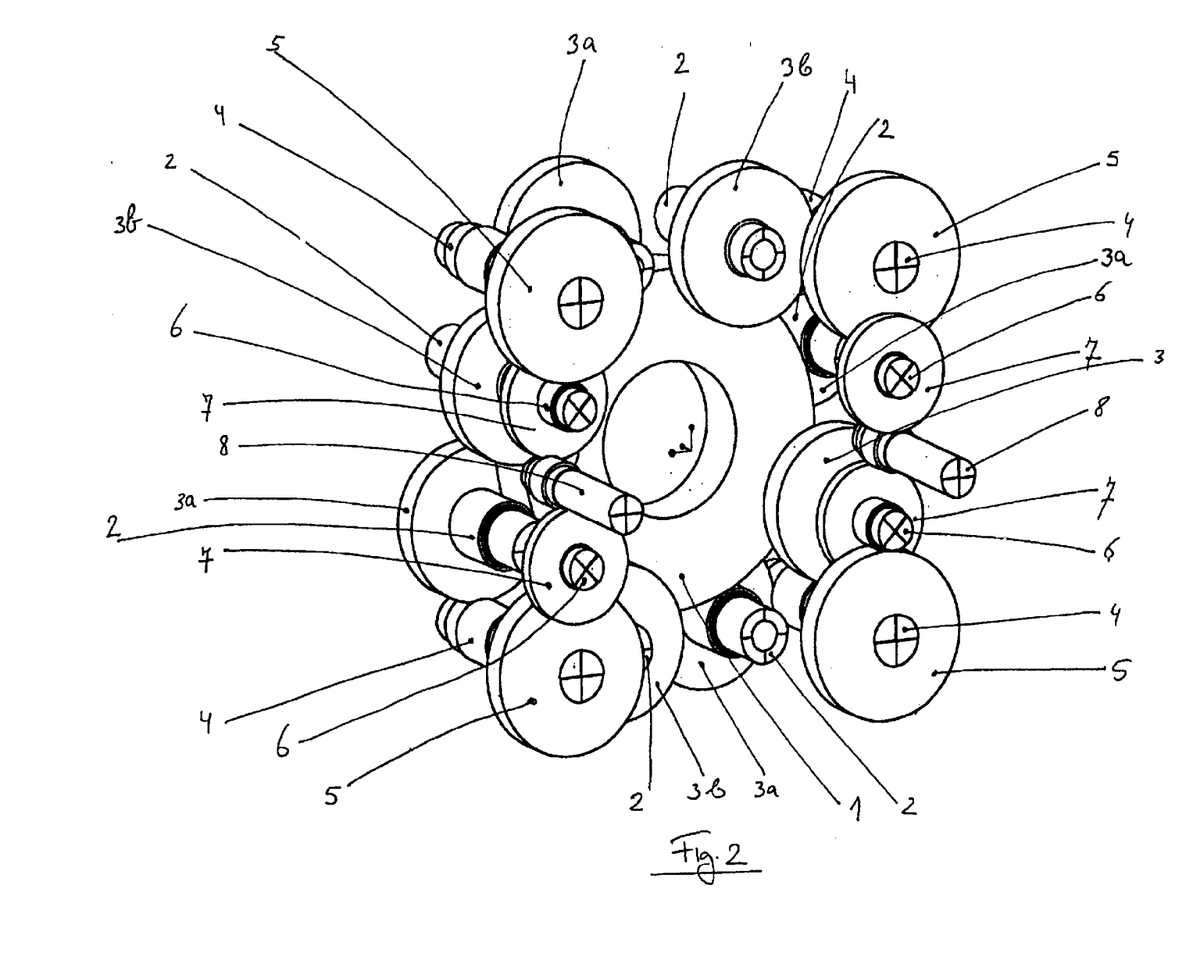
FIG. 2 is a perspective view of the one embodiment of the gear drive apparatus shown in FIG. 1, as shown from the perspective of the generator side of the gear drive apparatus.
Figure 3:
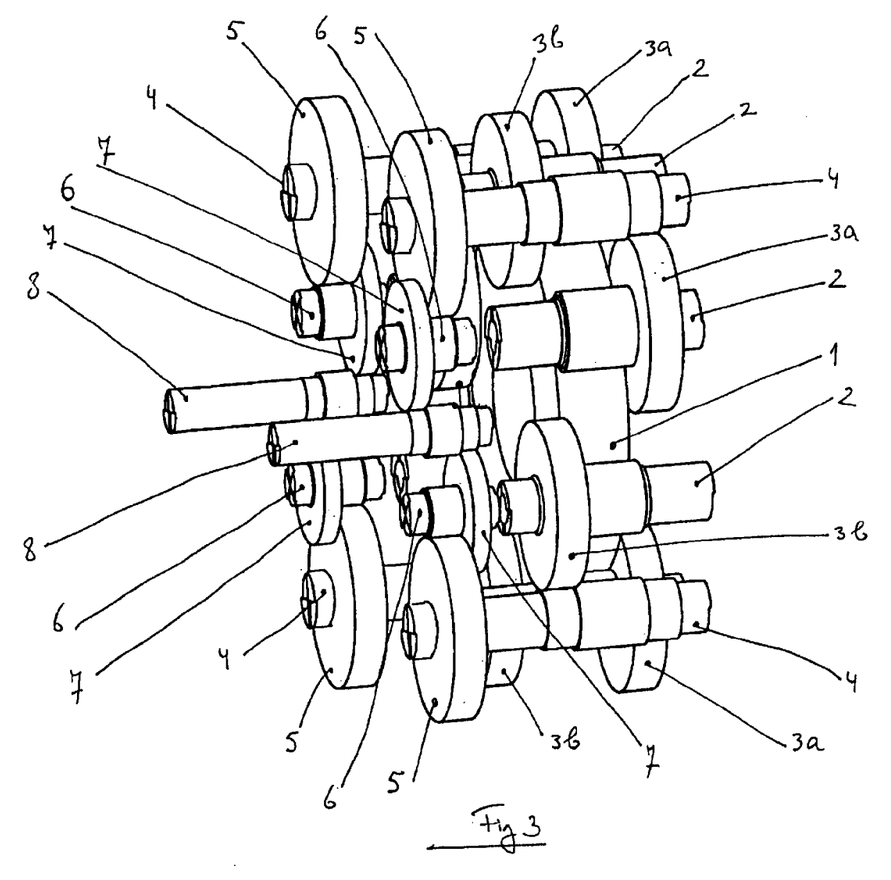
FIG. 3 is a perspective view of the one embodiment of the gear drive apparatus as viewed from the front.
Figure 4:
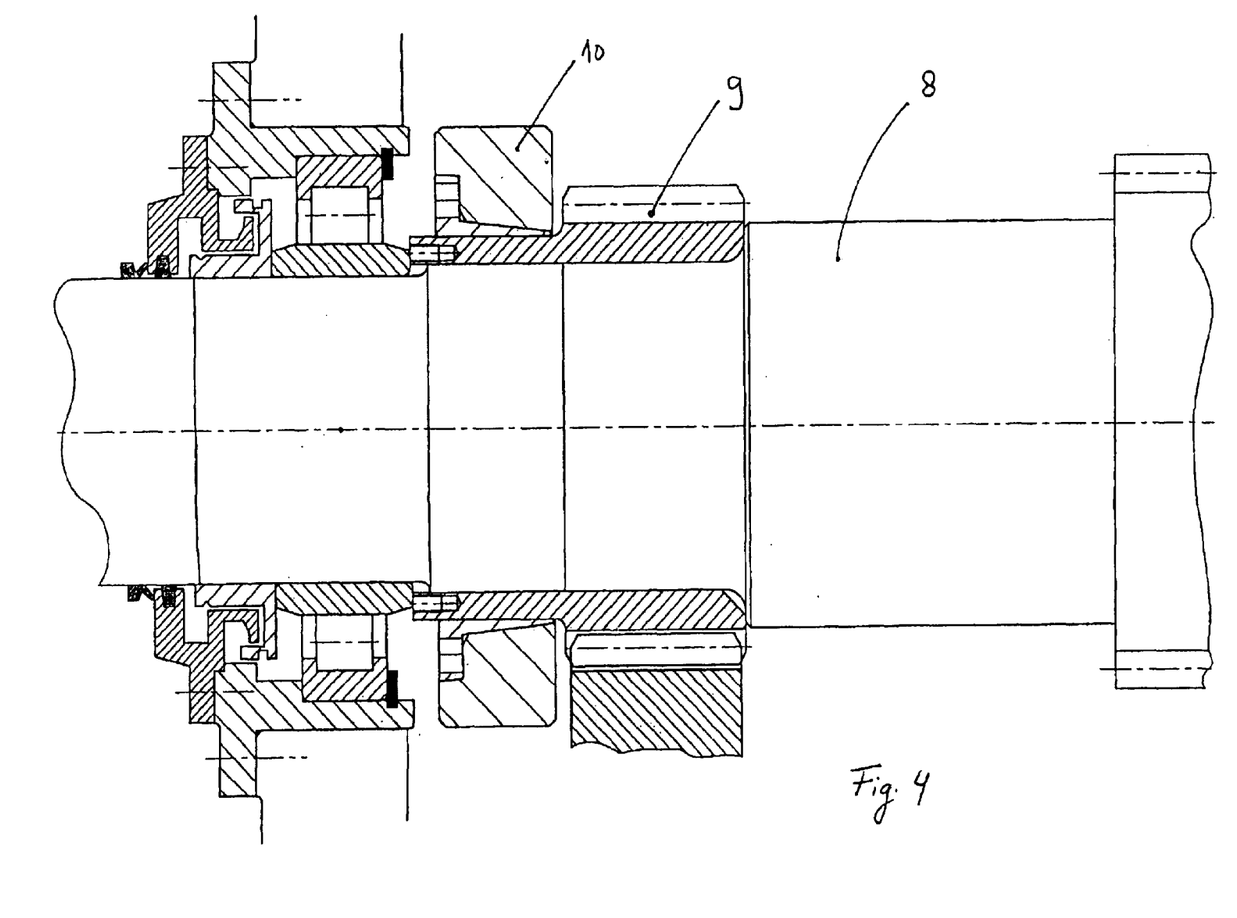
FIG. 4 is a sectional view through the output shaft of the one embodiment of the gear drive apparatus by which the gear drive apparatus is rotationally coupled to a generator.
Figure 5:
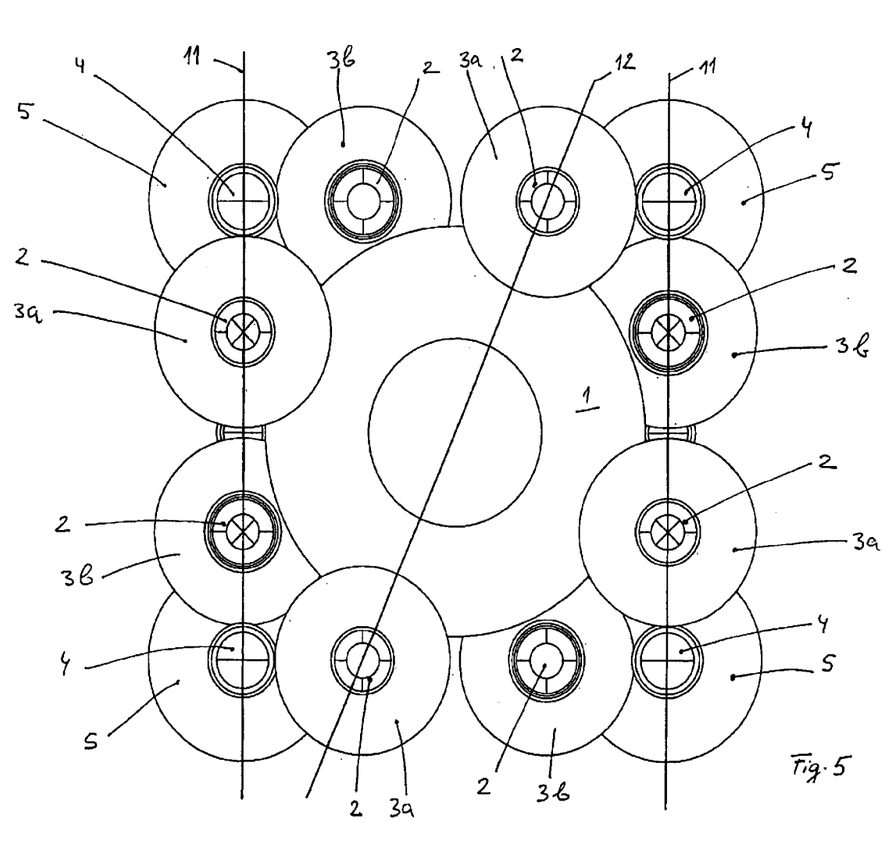
FIG. 5 is a side view of the one embodiment of the gear drive apparatus shown in FIG. 1, as viewed from the rotor side of the gear drive apparatus.
Figure 6:
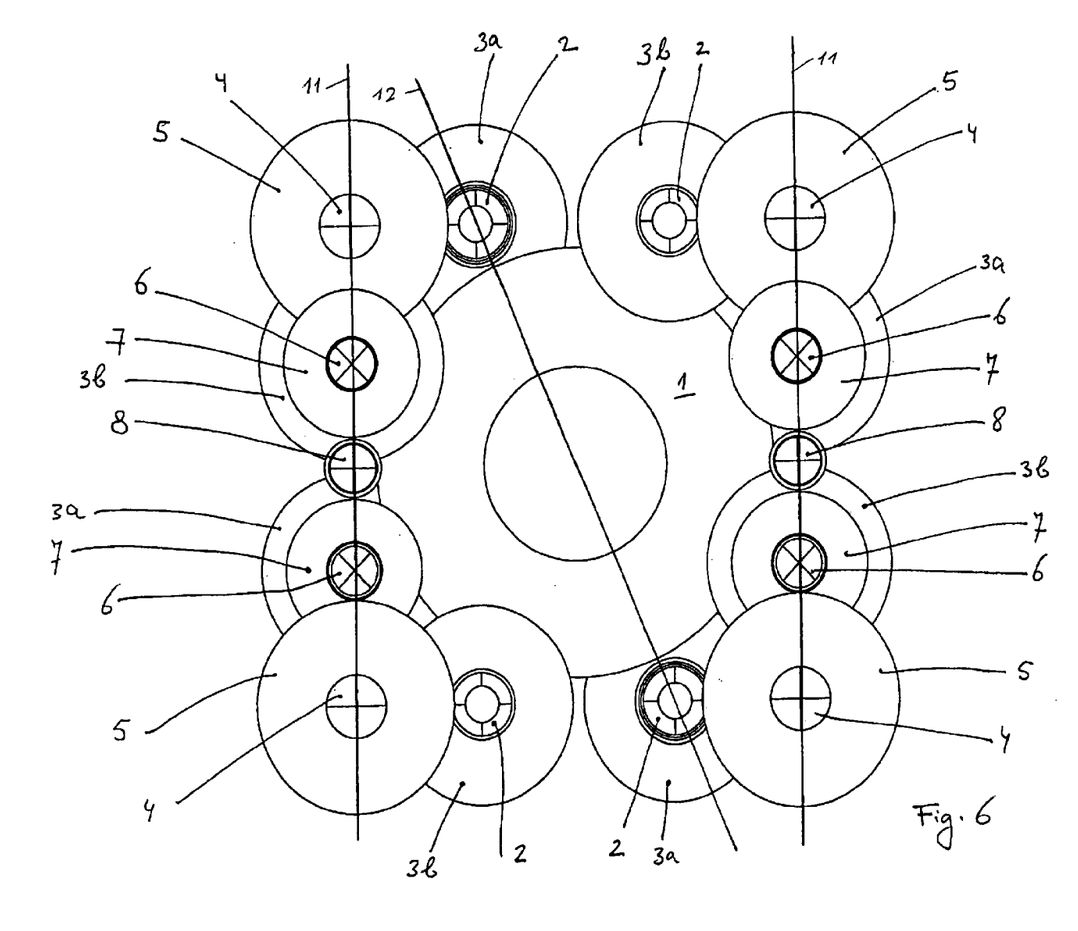
FIG. 6 is a side view of the one embodiment of the gear drive apparatus shown in FIG. 1, as viewed from the generator side of the gear drive apparatus.
Figure 7:
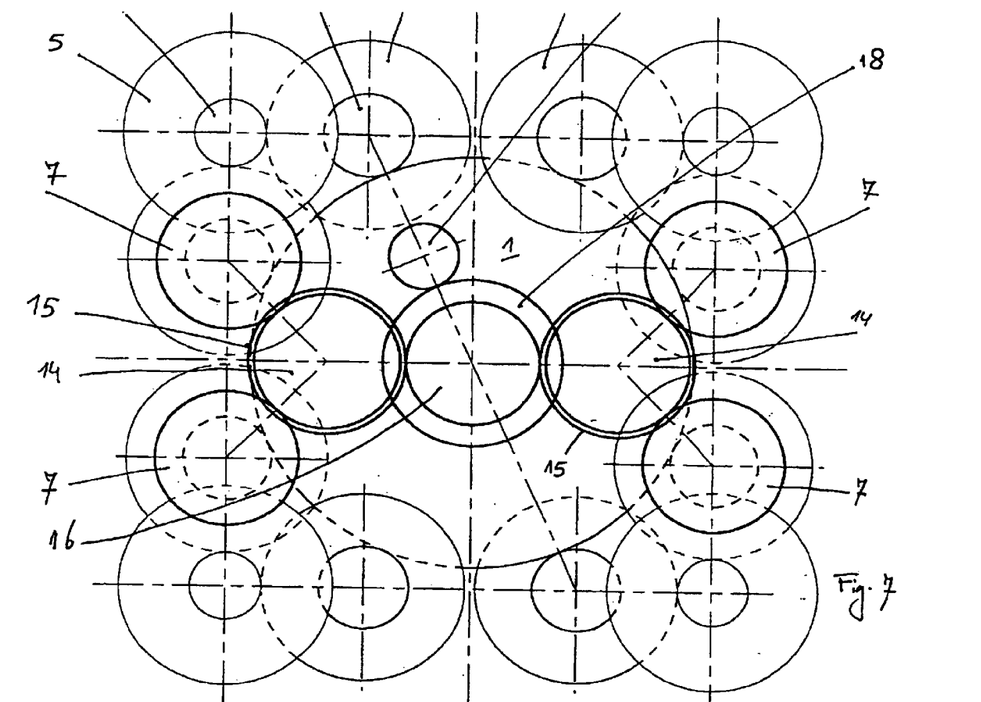
FIG. 7 is a side view of another embodiment of the gear drive apparatus of the present invention, as viewed from the generator side of the gear drive apparatus.
Figure 8:
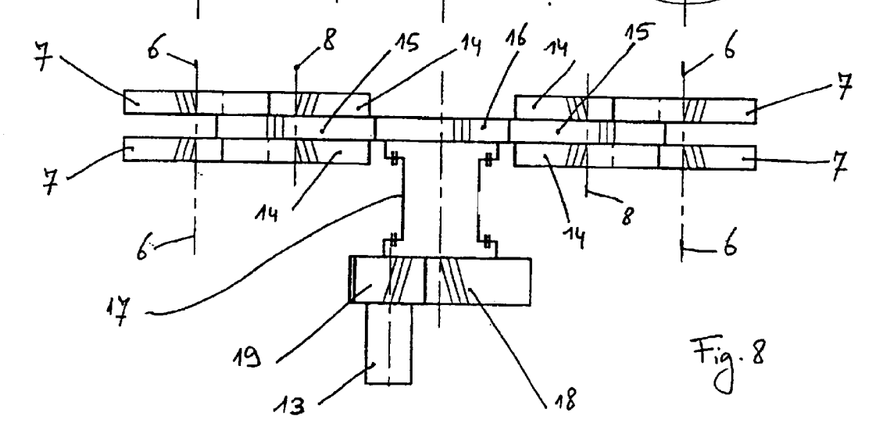
FIG. 8 is a top view of the embodiment of the gear drive apparatus shown in FIG. 7, as viewed in the direction A.

In FIGS. 7 and 8, another embodiment of the gear drive apparatus of the present invention is shown and includes a tertiary gear level or stage for branching the power, via both of the pinion shafts 8, to a single output shaft 13. In this embodiment, each of the pinion shafts 8 has a gear 14 secured thereto which, in turn, meshingly engages a gear 7 of the pinion shafts 6, and a gear 15 is associated therewith. This pair of gears 15 meshingly engages a gear 16 which is floatingly disposed therebetween, and which is supported solely by the gear teeth engagement thereof. This gear 16 is operatively connected via a rotationally non-turning angle compensation coupling 17 with a gear 18. This gear 18 meshingly engages a gear tooth pinion 19 which is fixedly secured to the single output shaft 13. This single output shaft 13 is supported in the gear housing and is operatively coupled to the generator of the wind power apparatus. The pinions 3a or 3b can be continuously or infinitely variably adjustably turned relative to one another via a forced feed lubrication connection between the pinion shafts 2 and the gears 3a, 3b. In this manner, the flanks of the gears of these gears 3a, 3b can be brought into respective opposed meshing engagement with one another in the proper axial position in a problem-free manner. This is a conventionally known technical practice which finds further application here. By use of this conventional technical practice, the portions of the pinion shafts 2 and the gears 3a, 3b, which do not lie along one of the parting lines 11, 12, can be segregated and separated.

The pinion shafts 8 are operably connected with a gear securement component 9 by means of a press fit disc or cinch collar 10, such that a continuous or infinitely variable adjustment is possible. In this manner, the pinion shafts 8 and their bearing supports can be disassembled from the gear drive apparatus without a separation thereof along the parting lines 11, 12.

The connection of the large gear 1 with the rotor shaft of the wind power apparatus can be effected directly by means of a hydraulic de-mountable press fit seating or by means of a key wedge. The seating can be cylindrical or conical. In this manner, the principal bearing support of the gear drive apparatus is directly connected to the rotor shaft. One connection which is favorable for mounting purposes is an indirect connection of the large gear 1 with the rotor shaft by means of a hollow shaft of the gear drive apparatus which is fixedly secured with the large gear 1. The torque transfer between the hollow shaft and the rotor shaft can be effected by means of press fit collars, key wedges, or by means of additional press fit discs.

Figure 9:
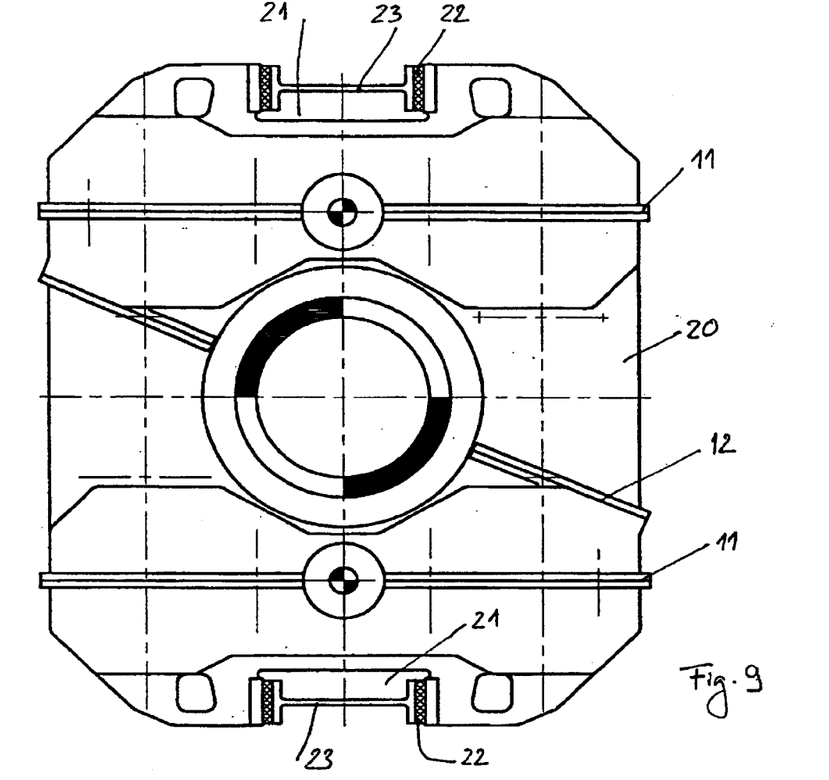
FIG. 9 is a side view of the gear drive housing.
Figure 10:
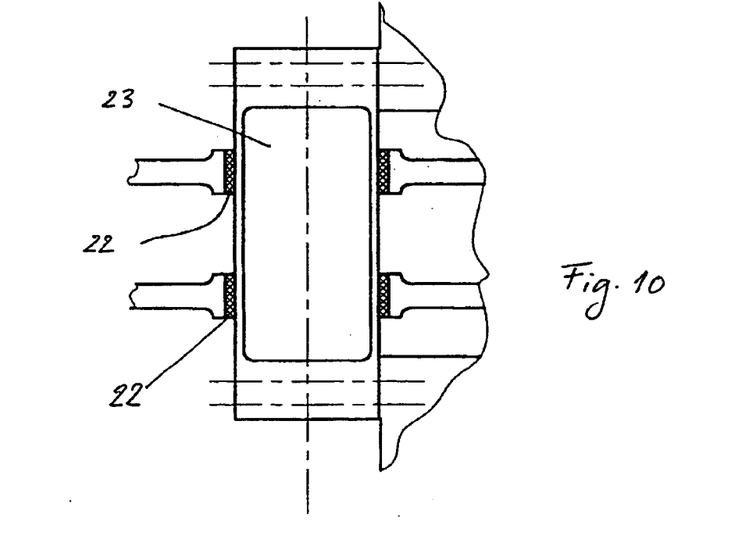
FIG. 10 is a partial perspective view of the gear drive housing shown in FIG. 9.

The serially opposed interconnected walls 20 of the gear housing, which are torsionally mutually resistant to turning, are configured to house the bearing supports of the pinion shafts 2 which encircle the large gear 1, and these walls 20 are configured as torque or torsional moment fulcrums. For this purpose, recesses 21 are provided on the side of the ends of the gear housing walls 20. Coupling components 23, which are supported by pre-tensioned rubber elements 22 in a free of play and resiliently biased manner, are mounted in these side open recesses 21, these coupling components being releasably connected to a separate base frame. Following a disassembly of the coupling components 23, the gear drive apparatus can, when deployed with a rotor of the wind power apparatus supported at two separate locations, be turned about 360 degrees around the principal axis of the gear drive apparatus.

Figure 11:
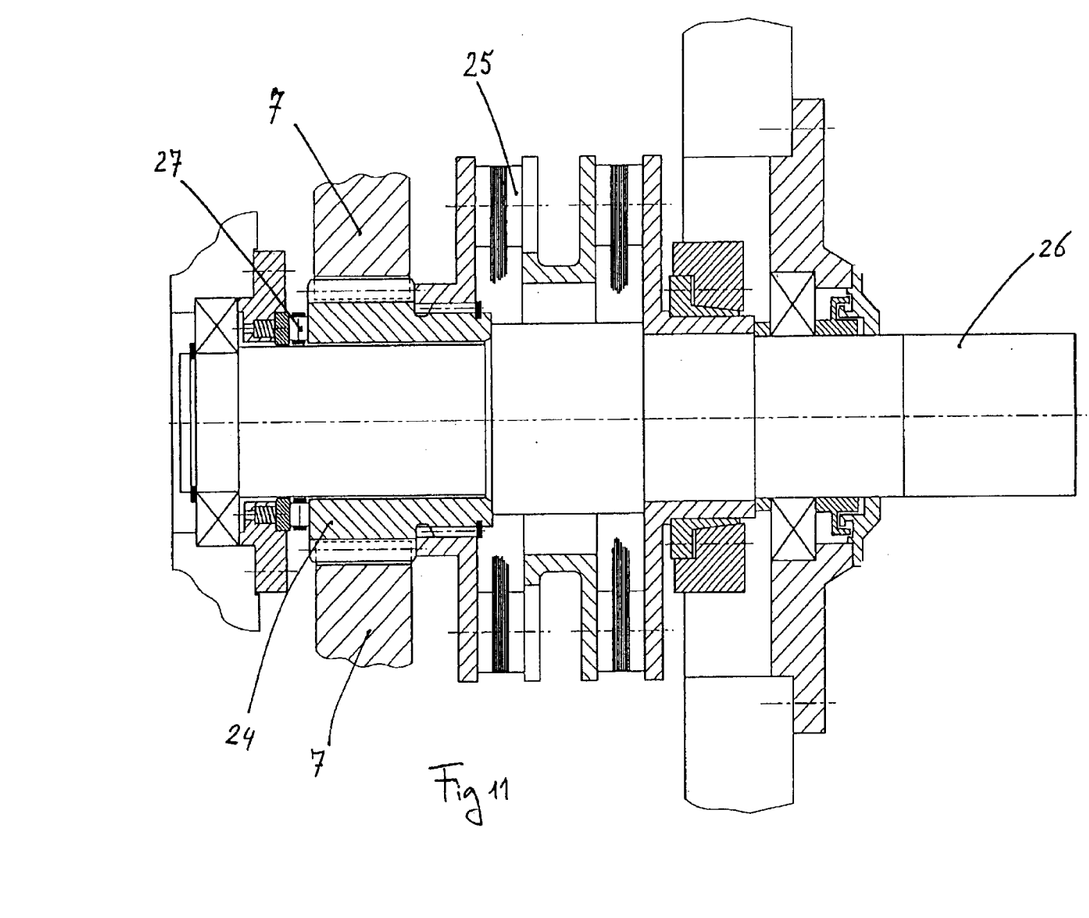
FIG. 11 s a sectional view of a further embodiment of the gear drive apparatus of the present invention taken through the output shaft thereof.

In FIG. 11, a further embodiment of the gear drive apparatus of the present invention is shown and comprises gears 7 each of which is paired with another gear 7 to form a gear pair, the gears 7 being straight gear teeth or, as desired, helical gear teeth, and the gears 7 meshingly engaging a radially freely supported pinion 24. The pinion 24 is connected via a double jointed coupling 25 with an output shaft 26. In order to provide a compensation of the loading, the gears 7 of each gear pair are angularly offset from one another as viewed with respect to the intersection of the axes of the respective pinion 24 by 180 degrees. In this manner, the sum of all the forces acting on the pinion 24 is zero. The meshing gear engagement by the two gears 7 and the floating arrangement of the pinion 24 provide for sufficient radial and gear play so that the pinion 24 is subjected to a force equalization and only a relatively limited minimal displacement due to the indexing error or radial run out error of the gears in the gear line. The pinion 24 is not permitted to leave its meshing engagement with the gears and become out of control. In connection with a helical gear toothed pinion 24 and correspondingly helical gear toothed gears 7, the axial components of the gear forces, which are oriented in the same direction, are opposed by an axial bearing 27 which only minimally limits the movement of the pinion 24.

The specification incorporates by reference the disclosure of German priority document 101 34245.4 of Jul. 18, 2001.

The present invention is, of course, in no way restricted to the specific disclosure of the specification and drawings, but also encompasses any modifications within the scope of the appended

What is claimed is:

1. A gear drive apparatus for converting a rotational input provided by a drive device into a predetermined rotational output for driving rotation of a driven device, comprising:

a large gear having gear teeth around its outer circumference and having an axis of rotation, the gear being coupled to a selected one of the drive device and the driven device;

a pair of output pinion shafts coupled to the other of the drive device and the driven device;

a first group of four primary level pinion shafts each having gear teeth meshingly engaged with the outer circumferential gear teeth of the large gear;

a second group of four primary level pinion shafts each having gear teeth meshingly engaged with the outer circumferential gear teeth of the large gear;

four primary level gears, each primary level gear being co-axially secured to a respective one of the first group of primary level pinion shafts for driving rotation thereby, and the gears being located on one axial side of the large gear;

four further primary level gears, each further primary level gear being co-axially secured to a respective one of the second group of primary level pinion shafts for driving rotation thereby, the gears being located on an opposite axial side of the large gear;

four common pinion shafts, each one of the primary level gears and the further primary level gears commonly meshingly engaging a respective one of the common pinion shafts to thereby drivingly rotate the pinion shaft;

four secondary level gears; and four secondary level pinion shafts, each secondary level pinion shaft being co-axially secured to a respective one of the secondary level gears and each secondary level pinion shaft being operably coupled with a respective one of the common pinion shafts for driving rotation thereby, each respective pair of the secondary level gears meshingly engaging a respective one of the output pinion shafts for driving rotation thereof.

2. A gear drive apparatus according to claim 1, wherein each output pinion shaft has herringbone gear teeth and is freely axially supported and the secondary level gears have helical gear teeth and each respective secondary level gears with a left increasing direction is paired with associated secondary level gear with a right increasing direction to form a pair of secondary level gears which commonly meshingly engage the herringbone teeth of one of the axially freely supported output pinion shafts.

3. A gear drive apparatus according to claim 1, wherein, in the secondary level, the power distribution is effected by the secondary level gears, each pair of which meshingly engages a respective one of a group of radially freely moveable pinions, the respective pair of secondary level gears of each gear pair being offset from one another by 180 degrees relative to the intersection of axes of the respective associate movable pinion, and the movable pinion being connected via a double jointed coupling with an output shaft.

4. A gear drive apparatus according to claim 3, wherein the secondary level gears and their respective associated movable pinions are provided with helical gear teeth and the movable pinions are supported against a axial bearing.

5. A gear drive apparatus according to claim 1, and further comprising a spur gear disposed between the primary and secondary gear levels.

6. A gear drive apparatus according to claim 1, wherein the large gear has a rotor shaft connected to a rotor of a wind power apparatus and the output pinion shafts are each operably connected with a respective generator of the wind power apparatus.

7. A gear drive apparatus according to claim 1, and further comprising a gear housing partitioned by two parting lines extending parallel to one another and a diagonally extending parting line with four of the eight pinion shafts of the primary gear level, the four common pinion shafts of the primary gear level, the four pinion shafts of the secondary gear level, and the two output shafts being disposed on both sides of the parallel extending parting lines, and the large gear and two remaining pinion shafts of the eight pinion shafts of the primary gear level being disposed on both sides of the diagonally extending parting line.

8. A gear drive apparatus according to claim 1, wherein the output pinion shafts are meshingly engaged with an output shaft forming a tertiary gear level.

9. A gear drive apparatus according to claim 8, and further comprising a pair of additional gears, a pair of further gears, a supplemental gear, a rotationally non-turning angle compensation coupling, an adjunct gear, a gear tooth pinion and an output shaft, each of the output pinion shafts being secured to one of the additional gears which, in turn, meshingly engage a gear of the secondary level pinion shafts, and each of the output pinion shafts being secured to one of the further gears which, in turn, meshingly engage the supplemental gear which is floatingly disposed therebetween and which is supported solely by the gear teeth engagement thereof, the supplemental gear being operatively connected via the rotationally non-turning angle compensation coupling with the adjunct gear, and the adjunct gear meshingly engaging the gear tooth pinion which is fixedly secured to the single output shaft supported in the gear housing.

10. A gear drive apparatus according to claim 1, and further comprising a gear housing having interconnected walls which are torsionally mutually stiffened so as to resist turning and configured to house bearing supports of the primary level pinion shafts which encircle the large gear, the walls being configured as torque moment fulcrums and having recesses on the side of their ends and coupling components supported by pre-tensioned rubber elements in a free of play and resiliently biased manner mounted in the recesses, the coupling components being releasably connected to a separate base frame.

* * * * *